(12) United States Patent
Baumann et al.

(10) Patent No.: US 7,582,342 B2
(45) Date of Patent: Sep. 1, 2009

(54) MOLDING COMPOSITION BASED ON POLYETHERAMIDES

(75) Inventors: Franz-Erich Baumann, Duelmen (DE); Wilfried Bartz, Marl (DE); Martin Himmelmann, Haltern am See (DE); Olivier Farges, Marl (DE)

(73) Assignee: Degussa AG, Düsseldorf (DE)

( * ) Notice: Subject to any disclaimer, the term of this patent is extended or adjusted under 35 U.S.C. 154(b) by 966 days.

(21) Appl. No.: 10/892,089

(22) Filed: Jul. 16, 2004

(65) Prior Publication Data

US 2005/0014842 A1 Jan. 20, 2005

(30) Foreign Application Priority Data

Jul. 18, 2003 (DE) ............................... 103 33 005

(51) Int. Cl.
- B29C 49/00 (2006.01)
- B29D 22/00 (2006.01)
- C08L 77/12 (2006.01)

(52) U.S. Cl. .................. 428/35.7; 264/563; 525/66; 525/92 B; 525/179; 525/181; 525/182; 525/184

(58) Field of Classification Search .................. 525/66, 525/92 B, 179, 181, 182, 183; 428/35.7; 264/563

See application file for complete search history.

(56) References Cited

U.S. PATENT DOCUMENTS

| | | | |
|---|---|---|---|
| 4,356,300 A | | 10/1982 | Isler et al. |
| 4,839,441 A | * | 6/1989 | Cuzin et al. .................. 528/328 |
| 5,348,804 A | | 9/1994 | Vasselin et al. |
| 5,405,936 A | | 4/1995 | Mumcu et al. |
| 5,543,489 A | * | 8/1996 | Alex et al. .................. 528/288 |
| 5,668,242 A | | 9/1997 | Simon et al. |
| 5,869,414 A | | 2/1999 | Fischer et al. |
| 5,932,687 A | | 8/1999 | Baumann et al. |
| 6,060,550 A | | 5/2000 | Simon et al. |
| 6,149,836 A | | 11/2000 | Mumcu et al. |
| 6,300,413 B1 | | 10/2001 | Simon et al. |
| 6,316,537 B1 | | 11/2001 | Baumann et al. |
| 6,335,101 B1 | | 1/2002 | Haeger et al. |
| 6,579,581 B2 | | 6/2003 | Bartz et al. |
| 6,589,606 B2 | | 7/2003 | Waterkamp et al. |
| 6,656,997 B2 | | 12/2003 | Baumann et al. |
| 6,677,015 B2 | | 1/2004 | Himmelmann et al. |
| 6,766,091 B2 | | 7/2004 | Beuth et al. |
| 6,784,227 B2 | | 8/2004 | Simon et al. |
| 2002/0026009 A1 | | 2/2002 | Beusen |
| 2003/0114636 A1 | | 6/2003 | Schiffer et al. |
| 2003/0124281 A1 | | 7/2003 | Ries et al. |
| 2003/0162899 A1 | | 8/2003 | Baumann et al. |
| 2004/0086735 A1 | | 5/2004 | Monsheimer et al. |
| 2004/0097636 A1 | | 5/2004 | Baumann et al. |
| 2004/0102539 A1 | | 5/2004 | Monsheimer et al. |
| 2004/0106691 A1 | | 6/2004 | Monsheimer et al. |
| 2004/0137228 A1 | | 7/2004 | Monsheimer et al. |
| 2004/0138363 A1 | | 7/2004 | Baumann et al. |
| 2004/0140668 A1 | | 7/2004 | Monsheimer et al. |
| 2004/0180980 A1 | | 9/2004 | Petter et al. |
| 2004/0204531 A1 | | 10/2004 | Baumann et al. |
| 2004/0206443 A1 | | 10/2004 | Monsheimer et al. |
| 2004/0232583 A1 | | 11/2004 | Monsheimer et al. |
| 2005/0014842 A1 | | 1/2005 | Baumann et al. |
| 2005/0027047 A1 | | 2/2005 | Monsheimer et al. |
| 2005/0027050 A1 | | 2/2005 | Monsheimer et al. |
| 2005/0038201 A1 | | 2/2005 | Wursche et al. |

FOREIGN PATENT DOCUMENTS

| | | |
|---|---|---|
| CH | 642 682 A5 | 5/1984 |
| EP | 0 459 862 B1 | 12/1991 |
| EP | 1 329 481 A2 | 7/2003 |
| JP | 59-207930 | 11/1984 |

OTHER PUBLICATIONS

U.S. Appl. No. 10/347,439, filed Jan. 21, 2003, Baumann, et al.
U.S. Appl. No. 10/892,089, filed Jul. 16, 2004, Baumann, et al.
U.S. Appl. No. 11/356,416, filed Feb. 17, 2006, Monsheimer, et al.
U.S. Appl. No. 11/241,667, filed Oct. 3, 2005, Monsheimer, et al.

(Continued)

*Primary Examiner*—Ana L Woodward
(74) *Attorney, Agent, or Firm*—Oblon, Spivak, McClelland, Maier & Neustadt, P.C.

(57) ABSTRACT

A composition suitable for molding is provided having the following components:

I. from 97 to 80 parts by weight of a polyetheramide, having units based on one or more linear aliphatic diamines having from 6 to 14 carbon atoms, one or more linear aliphatic or aromatic dicarboxylic acids having from 6 to 14 carbon atoms, and one or more polyetherdiamines having at least 3 carbon atoms per ether oxygen and having primary amino groups at the chain ends, II. from 3 to 20 parts by weight of a rubber containing one or more functional groups; and where the total of the parts by weight of I and II is 100; and moldings produced therefrom.

26 Claims, No Drawings

OTHER PUBLICATIONS

U.S. Appl. No. 11/293,360, filed Dec. 5, 2005, Monsheimer, et al.
U.S. Appl. No. 11/335,587, filed Jan. 20, 2006, Monsheimer, et al.
U.S. Appl. No. 11/354,114, filed Feb. 15, 2006, Dowe, et al.
U.S. Appl. No. 11/354,100, filed Feb. 15, 2006, Dowe et al.
"Technische Thermoplaste Polyamide", Kunststoff Handbuch, 1998, 33 pages (with Partial English Translation).
D. LeBlanc, et al., "Additive zum Blasformen von Polyamiden", Kunststoffe, 82, 9, 1992, pp. 777-782 (with Partial English Translation).
W. Pfleger, et al., "Blasformbare Polyamide", Kunststoffe, 86, 1, 1996, pp. 61-65 (with Partial English Translation).
U.S. Appl. No. 11/484,593, filed Jul. 12, 2006, Monsheimer, et al.
U.S. Appl. No. 11/480,459, filed Jul. 5, 2006, Dowe, et al.

* cited by examiner

MOLDING COMPOSITION BASED ON POLYETHERAMIDES

FIELD OF THE INVENTION

The invention relates to polyetheramide compositions with excellent heat resistance and hydrolysis resistance, and which are suitable for the extrusion of flexible pipes, and for the production of flexible blow moldings.

BACKGROUND OF THE INVENTION

Plasticized semicrystalline polyamide molding compositions, and in particular, those compositions based on PA11 or PA12, have long been used as extruded pipes in automotive construction, since these compositions have excellent mechanical strength and chemicals resistance. However, the extruded and molded products stiffen after a short use period at the high temperatures, which are increasing in engine applications. This stiffening is attributed to the volatility of the external plasticizers. In addition, when the extruded products are exposed to pressure, they have a tendency toward irreversible deformation at increased temperatures of 110 to 150° C. Although these disadvantages can be avoided by using molding compositions based on higher-melting polyetheresteramides, for example as described in EP-A-0 095 893, this class of polyamide elastomer is unsuitable for producing pipes usable for the abovementioned applications, since, in relation to hydrolysis resistance, these molding compositions fall far short of the resistance of traditional polyamide molding compositions, and fail after just a few weeks.

SUMMARY OF THE INVENTION

Accordingly, one object of the invention is to produce a hydrolysis-resistant composition, and in particular, a hydrolysis-resistant molding composition, with high heat resistance and high melt viscosity, that is readily capable of extrusion or blow molding. A further object is to provide a molding that, without the need of external plasticizers, has adequate long-lasting flexibility, and very good low-temperature impact strength.

These and other objects of the present invention have been satisfied, either individually or in combinations thereof, by the discovery of a composition, comprising the following components:

I. from 97 to 80 parts by weight of a polyetheramide, comprising units based on one or more linear aliphatic diamines having from 6 to 14 carbon atoms, one or more linear aliphatic or aromatic dicarboxylic acids having from 6 to 14 carbon atoms, and one or more polyetherdiamines having at least 3 carbon atoms per ether oxygen and having primary amino groups at the chain ends, II. from 3 to 20 parts by weight of a rubber containing one or more functional groups; and wherein the total of the parts by weight of I and II is 100; and moldings produced therefrom.

DETAILED DESCRIPTION OF THE PREFERRED EMBODIMENTS

The present invention relates to a composition which comprises the following components:

I. from 97 to 80 parts by weight, preferably from 95 to 85 parts by weight, of a polyetheramide, comprising units based on one or more linear aliphatic diamines having from 6 to 14 carbon atoms, including, but not limited to, one or more diamines having 6, 7, 8, 9, 10, 11, 12, 13 or 14 carbon atoms, preferably having 6 to 12 carbon atoms, more preferably 8 to 10 carbon atoms; one or more linear aliphatic or aromatic dicarboxylic acids having from 6 to 14 carbon atoms, including, but not limited to, one or more dicarboxylic acids having 6, 7, 8, 9, 10, 11, 12, 13 or 14 carbon atoms, preferably 6 to 12 carbon atoms, more preferably 8 to 10 carbon atoms; and one or more polyetherdiamines having at least 3 or more, preferably 4 or more carbon atoms per ether oxygen and having primary amino groups at the chain ends;

II. from 3 to 20 parts by weight, preferably from 5 to 15 parts by weight, and more preferably from more than 5 to 15 parts by weight, of a rubber containing one or more functional groups;

where the total of the parts by weight of I and II is 100,

III. from 0 to 50% by weight, preferably from 0.1 to 30% by weight, and more preferably from 1 to 20% by weight, based on weight of the composition, of one or more other polymers; and IV. from 0 to 10% by weight, based on the weight of the composition, of one or more conventional additives.

Polyetheramides are known in principle, for example, those described in reference U.S. Pat. No. 4,356,300. However, the polyetheramides based on caprolactam or laurolactam, as described in detail in this reference, cannot be used, since their melting points are too low and their melt viscosities are too low.

The polyetheramides used, according to the invention, as component I, have a melting point, $T_m$ (measured by DSC, according to ISO 11357 at second heating at a rate of 20 K/min), which is preferably at least 160° C., and more preferably at least 175° C.; a relative solution viscosity, $\eta_{rel}$, which is preferably at least 1.80 and more preferably at least 1.85, as measured in a 0.5% strength by weight solution in m-cresol at 23° C. (according to ISO 307); and a zero-shear viscosity at 220° C. which is preferably at least 500 Pas, and more preferably 800 Pas, as measured in a mechanical spectrometer (cone/plate, according to ASTM D 4440). The resultant molding composition is ideally intended to have a zero-shear viscosity above 2,000 Pas and in particular, above 5,000 Pas, at 220° C., as measured according to ASTM D 4440; otherwise a stable extrusion with retention of dimensions for the desired pipes or other moldings is not practical, or possible only within a temperature range that is too narrow for cost-effective manufacture.

If the abovementioned melt viscosities or solution viscosities of the polyetheramides are achieved or exceeded, the incorporation of the rubber of component II will produce, without difficulty, a desired additional increase in melt viscosity.

Examples of diamines used in preparing the polyetheramides are 1,6-hexamethylenediamine, 1,8-octamethylenediamine, 1,9-nonamethylenediamine, 1,10-decamethylenediamine, and 1,12-dodecamethylenediamine. Examples of dicarboxylic acids are adipic acid, suberic acid, azelaic acid, sebacic acid, 1,12-dodecanedioic acid, 1,14-tetradecanedioic acid, terephthalic acid and 2,6-naphthalenedicarboxylic acid.

Suitable polyetherdiamines can be obtained via the conversion of the corresponding polyetherdiols through reductive amination, or coupling to acrylonitrile with subsequent hydrogenation (see EP-A-0 434 244 and EP-A-0 296 852, which are both incorporated herein by reference in their entirety). They generally have a number-average molecular weight of from 230 to 4,000, and their proportion in the polyetheramide is preferably from 5 to 50% by weight. All average molecular weights referred to herein, unless otherwise specified, are number average molecular weights.

Commercially available polyetherdiamines derived from propylene glycol are available from Huntsman as JEFFAMIN® D grades. In principle, polyetherdiamines derived from 1,4-butanediol or 1,3-butanediol also have good suitability, as do polyetherdiamines of mixed structure, for example, with random or block distribution of the units derived from diols. A desirable degree of difunctionality in the polyetherdiamines, expressed in terms of the molar proportion of acetylable amino and hydroxy end groups, is generally at least 95%, and preferably at least 98%, and the desired diamine content here is at least 90%, preferably at least 95%, for example, as determined acidimetrically. In view of the high molar masses (high molecular weights) which have to be achieved, it is hardly necessary to mention the further requirement for approximate equivalence between the dicarboxylic acid used and the sum of the diamine and polyetherdiamine. Practical "amino:carboxy" molar ratios used are from about "0.98:1" to about "1.02:1."

To increase molecular weight, side reactions which adversely affect the end groups or cleave the polymeric chains need to be substantially suppressed. The practical temperature range for the melt polycondensation is from about 220 to about 245° C.; the low limit resulting from the melting points of the underlying polyamides, and the upper limit from the initiation of thermal decomposition of the polyetherdiamines.

Surprisingly, drastic conditions have to be used for any necessary solid-phase post-condensation. Whereas experience has shown that temperatures of from about 155 to about 165° C. are sufficient for aliphatic polyamides, such as PA612, PA1010, PA1012, or PA1212, post-condensation temperatures of from about 165 to about 185° C. are required for the polyetheramides derived from these polyamides, or the constituents comprising these polyamides, and used according to the invention. In order to avoid caking, the solid-phase post-condensation temperature should not be higher than 10 K (or ten degrees Celsius) below the crystallite melting point $T_m$. It will be obvious to the person skilled in the art that post-condensation is carried out either under high vacuum or in a stream of inert gas. A possible reason for the relatively low post-condensation activity of the polyetheramides may be that the reactivity of their amino end groups, which are to some extent sterically hindered, is lower than that of conventional amino end groups deriving from aliphatic diamines.

It is preferably that at least 30% of the end groups in the resulting polyetheramide are amino end groups, and it is more preferable that at least 50% of the end groups, and in particular at least 60% of the end groups, are amino end groups.

By way of example, the rubber (Component II) used according to the invention is a copolymer selected from one or more of the following:
  ethylene-α-olefin copolymers containing anhydride groups,
  styrene-ethylene/butylene block copolymers containing anhydride groups,
  ethylene-glycidyl (meth)acrylate copolymers,
  ethylene-(meth)acrylate-glycidyl (meth)acrylate terpolymers, or
  ethylene-(meth)acrylate-α,β-unsaturated carboxylic anhydride terpolymers.

The ethylene-α-olefin copolymer containing anhydride groups can be prepared in any known manner, such as by free-radical reaction of an ethylene-α-olefin copolymer with an α,β-unsaturated dicarboxylic anhydride or with a precursor thereof, e.g. maleic anhydride, monobutyl maleate, maleic acid, fumaric acid, aconitic acid, itaconic acid, or itaconic anhydride. The ethylene-α-olefin copolymer may, by way of example, be an ethylene $C_3$-$C_{12}$-α-olefin copolymer having from 20 to 96% by weight, preferably from 25 to 85% by weight, of ethylene; or an ethylene $C_3$-$C_{12}$-α-olefin-unconjugated diene terpolymer having from 20 to 96% by weight, preferably from 25 to 85% by weight, of ethylene, and having up to at most, about 10% by weight of an unconjugated diene, such as bicyclo[2.2.1]heptadiene, 1,4-hexadiene, dicyclopentadiene, or 5-ethylidenenorbornene. By way of example, propene, 1-butene, 1-pentene, 1-hexene, 1-octene, 1-decene, or 1-dodecene are suitable as $C_3$-$C_{12}$-α-olefins. Typical examples are the ethylene-propylene rubber (EPM), ethylene-propylene-diene rubber (EPDM), ethylene-butylene rubber, LLDPE (linear low-density polyethylene), and VLDPE (very-low-density polyethylene). The copolymer generally contains from 0.5 to 6% by weight, preferably from 1 to 5% by weight, and more preferably from 2 to 4% by weight, of units which derive from the α,β-unsaturated dicarboxylic anhydride.

The styrene-ethylene/butylene block copolymers preferably comprise styrene-ethylene/butylene-styrene block copolymers (SEBS), these being obtainable via hydrogenation of styrene-butadiene-styrene block copolymers. However, it is also possible to use diblock systems (SEB) or multiblock systems. Block copolymers of this type are known in the art. The styrene-ethylene/butylene block copolymer containing anhydride groups is prepared in a known manner via free-radical reaction of a styrene-ethylene/butylene block copolymer with an α,β-unsaturated dicarboxylic anhydride or with a precursor thereof, e.g., maleic anhydride, monobutyl maleate, maleic acid, fumaric acid, aconitic acid, itaconic acid, or itaconic anhydride. The block copolymer generally contains from 0.5 to 6% by weight, preferably from 1 to 5% by weight, and more preferably from 2 to 4% by weight, of units which derive from the α,β-unsaturated dicarboxylic anhydride.

The units substantively present in the ethylene-glycidyl (meth)acrylate copolymers are usually those of the following monomers:
  from 20 to 98% by weight, preferably from 30 to 97% by weight, and more preferably from 40 to 96% by weight, of ethylene, and
  from 2 to 80% by weight, preferably from 3 to 70% by weight, and more preferably from 4 to 60% by weight, of glycidyl acrylate and/or glycidyl methacrylate.

The units substantively present in the ethylene-(meth)acrylate-glycidyl (meth)acrylate terpolymer are usually those of the following monomers:
  from 20 to 97.9% by weight, preferably from 30 to 69.9% by weight, and more preferably from 40 to 95.9% by weight, of ethylene,
  from 0.1 to 78% by weight, preferably from 1 to 67% by weight, and more preferably from 2 to 56% by weight, of an acrylate and/or methacrylate esterfied with a $C_1$-$C_{12}$ alcohol, and
  from 2 to 80% by weight, preferably from 3 to 70% by weight, and more preferably from 4 to 60% by weight, of glycidyl acrylate and/or glycidyl methacrylate.

By way of example, the acrylates or methacrylates comprise one or more of the following compounds: methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate or 2-ethylhexyl methacrylate.

The units substantively present in the ethylene-(meth)acrylate-α,β-unsaturated carboxylic anhydride terpolymer are usually those of the following monomers:

from 20 to 97.5% by weight, preferably from 30 to 95% by weight, and more preferably from 40 to 92% by weight, of ethylene, from 2 to 79.5% by weight, preferably from 4 to 69% by weight, and more preferably from 6 to 58% by weight, of an acrylate or methacrylate, and from 0.5 to 6% by weight, preferably from 1 to 5% by weight, and more preferably from 2 to 4% by weight, of an α,β-unsaturated carboxylic anhydride.

The respective compounds mentioned above for use as acrylates or methacrylates, or as α,β-unsaturated carboxylic anhydrides or their precursors, may be used.

Suitable polymers of component III include predominantly polymers and copolymers that are compatible with the polyetheramide, including, but not limited to, polyamides. It is preferable to use a polyamide whose type is the same as that of the hard sequences of the polyetheramide. The polyamide advantageously has a relative solution viscosity, $\eta_{rel}$, of at least 1.9.

Suitable additives for component IV include, but are not limited to, stabilizers; carbon black (such as conductivity black); flame retardants, for example, melamine cyanurate; pigments; and processing aids. Polymers included in the definition of component III are excluded here.

The incorporation of a copolymer of component II, and, where appropriate, of the additives of components III and IV, takes place in the melt, with shear, for example in a twin-screw extruder or co kneader.

By way of example, the inventive compositions may be processed via extrusion, conventional blow molding or 3D blow molding, for example, parison extrusion into an open half of a mold, 3D parison manipulation or 3D suction blow molding, or sequential blow molding to produce hard/soft composites, or via any other blow molding procedure.

Other methods of processing the compositions are coextrusion, coextrusion blow molding, coextrusion 3D blow molding, coextrusion suction blow molding, etc., to give a multilayer composite.

The compositions may also be processed by injection molding, and this includes versions of the process, such as GIT (internal gas pressure technique) or WIT (water injection technique).

Examples of products which may be produced by the processes mentioned, are single-layer pipes and multilayer pipes. These pipes may be smooth or have corrugation in some regions or throughout. The composition is also used for the production of profiles of any type, such as sealing profiles, or hollow articles, such as containers.

Moldings, or molded articles produced by the compositions of the invention can be used in motor vehicle construction, in mechanical engineering and chemical engineering projects, and in medical technology. In particular, the moldings can be used for a subatmospheric-pressure line, e.g., for brake servos; an air line; a pressure hose, such as a compressed air line; a control line; a coolant line; a fuel line; a ventilation line; a windshield-wash system line; a line for hydraulic coupling systems; a servo control line; a line for air-conditioning systems of motor vehicles; a cable sheath or wire sheath; or a line for a mechanical or chemical engineering sector. These moldings can also be used as a line or product for medical devices, or as an injection-molded part of an oil filter or of a fuel filter. These molding are encompassed by the present invention.

The moldings or molded articles can be produced by extrusion, coextrusion, blow molding, 3D blow molding, coextrusion blow molding, coextrusion 3D blow molding, coextrusion suction blow molding, or injection molding, among other techniques.

EXAMPLES

Having generally described this invention, a further understanding can be obtained by reference to certain specific examples which are provided herein for purposes of illustration only, and are not intended to be limiting unless otherwise specified.

Preparation of the Polyetheramide:

A 200 l stirred autoclave was charged with the following starting materials:

| | |
|---|---|
| 26.11 kg | of hexamethylenediamine in the form of a 75% strength by weight aqueous solution, |
| 52.94 kg | of 1,12-dodecanedioic acid, |
| 25.55 kg | of JEFFAMIN ® D400, |
| 100 g | of a 50% strength by weight aqueous solution of hypophosphorous acid. |

The starting materials were melted under nitrogen and heated, with stirring, to about 220° C. in the sealed autoclave, the resultant internal pressure being about 20 bar. This internal pressure was retained for 2 hours, and then the melt was heated further to 230° C., with continuous depressurization to atmospheric pressure, and then held for 1.5 hours at this temperature in a stream of nitrogen. The vessel was then evacuated to 28 mbar within a period of 3 hours, and held for a further 3 hours at this pressure, until the indicated torque showed no further rise in melt viscosity. The melt was then discharged by gear pump and strand-pelletized. The pellets were dried for 24 hours under nitrogen at 80° C.

The properties of the product were as follows:

| | |
|---|---|
| Crystallite melting point $T_m$: | 193° C. |
| Relative solution viscosity $\eta_{rel}$: | 1.91 |
| COOH end groups: | 21 mmol/kg |
| Amino end groups: | 26 mmol/kg |

On the basis of the ratio of the monomers used, this polyetheramide formally has a PA612 block with a number average molecular weight of 1,083.

50 kg of these pellets were post-condensed for 24 hours at 175° C. jacket temperature under nitrogen (250 l/h) in a tumbling dryer of capacity 250 l. After this time, the properties of the product were as follows:

| | |
|---|---|
| Crystallite melting point $T_m$: | 193° C. |
| Relative solution viscosity $\eta_{rel}$: | 2.06 |
| COOH end groups: | 14 mmol/kg |
| Amino end groups: | 20 mmol/kg |

Preparation of the Molding Compositions:

The mixing specification for the molding compositions is given in parts by weight. The individual constituents of the mixing specification were incorporated in a twin-screw extruder from Werner & Pfleiderer, the barrel temperature being 250° C.

TABLE 1

| Constituent | Reference | 1 | 2 | 3 | 4 | 5 | 6 |
|---|---|---|---|---|---|---|---|
| Polyetheramide | 97.25 | 94.25 | 92.25 | 87.25 | 82.25 | 92.25 | 82.25 |
| PA612, excess of amino end groups; $\eta_{rel}$ = 2.25 | — | — | — | 5.0 | 10.0 | — | 10.0 |
| EXXELOR ® VA 1803 (according to product brochure, an EPM rubber having about 0.7% by weight of grafted-on maleic anhydride) | — | 3.0 | 5.0 | 5.0 | 5.0 | — | — |
| Ethylene-acrylate-glycidyl methacrylate terpolymer; 60/32/8 parts by weight | — | — | — | — | — | 5.0 | 5.0 |
| Amine heat stabilizer | 0.50 | 0.50 | 0.50 | 0.50 | 0.50 | 0.50 | 0.50 |
| Stabilizer masterbatch, iodide-based | 1.00 | 1.00 | 1.00 | 1.00 | 1.00 | 1.00 | 1.00 |
| Black colorant pellets | 1.25 | 1.25 | 1.25 | 1.25 | 1.25 | 1.25 | 1.25 |
| Ceasit PC (calcium stearate; external) | 0.04 | 0.04 | 0.04 | 0.04 | 0.04 | 0.04 | 0.04 |
| Iso 179/1eA notched impact strength [kJ/m$^2$] at 23° C. | 41 | 81 | 113 | 118 | 120 | 109 | 115 |
| At −40° C. | 3.1 | 4.9 | 6.5 | 7.5 | 7.8 | 4.9 | 5.9 |
| ISO 527 tensile modulus of elasticity [MPa] | 550 | 510 | 490 | 520 | 550 | 480 | 570 |

It is apparent that a marked improvement in notched impact strength both at room temperature and at −40° C. is obtained when the fall off in modulus of elasticity resulting from the rubber addition is compensated by simultaneous addition of polyamide. The modulus of elasticity can be adjusted as desired via the mixing ratio of the components.

The melt viscosity of the molding compositions obtained in Examples 1 to 6 was higher than that of the reference molding composition, and at the same time, the Examples had higher pseudoplasticity (gradient of curve of melt viscosity plotted against shear), making them particularly suitable for extrusion applications or blow molding applications.

The present application claims priority to German patent application 103 33 005.4, filed Jul. 18, 2003, which is herein incorporated in its entirety by reference.

Obviously, additional modifications and variations of the present invention are possible in light of the above teachings. It is therefore to be understood that within the scope of the appended claims, the invention may be practiced otherwise than as specifically described herein.

The invention claimed is:

1. A composition comprising the following components:
   I. from 97 to 80 parts by weight of a polyetheramide, comprising units based on one or more linear aliphatic diamines having from 6 to 14 carbon atoms, one or more linear aliphatic or aromatic dicarboxylic acids having from 6 to 14 carbon atoms, and one or more polyetherdiamines having at least 3 carbon atoms per ether oxygen and having primary amino groups at the chain ends, wherein said polyetheramide is obtained by reacting components of a composition comprising one or more of said linear aliphatic diamines, one or more of said linear aliphatic or aromatic dicarboxylic acids, and one or more of said polyetherdiamines,
   II. from 3 to 20 parts by weight of a rubber selected from the group consisting of ethylene-α-olefin copolymers containing anhydride groups, styrene-ethylene/butylene block copolymers containing anhydride groups, ethylene-glycidyl (meth)acrylate copolymers, ethylene-(meth)acrylate-glycidyl (meth)acrylate terpolymers, ethylene-(meth) acrylate-α,β-unsaturated carboxylic anhydride terpolymers, and combinations thereof; and
   wherein the total of the parts by weight of I and II is 100.

2. The composition of claim 1, wherein component I is present in an amount from 95 to 85 parts by weight, and component II is present in an amount from 5 to 15 parts by weight.

3. A molding produced by the composition of claim 1.

4. The molding of claim 3, which comprises a member selected from a single pipe, a multilayer pipe, or a hollow tube.

5. The composition of claim 1, wherein the polyetheramide of component I has a crystallite melting point, $T_m$, of at least 160° C.

6. The composition of claim 5, wherein the crystallite melting point, $T_m$, is at least 175° C.

7. The composition of claim 1, wherein the relative solution viscosity, $\eta_{rel}$, of the polyetheramide is at least 1.80.

8. The composition of claim 7, wherein the relative solution viscosity, $\eta_{rel}$, of the polyetheramide is at least 1.85.

9. The composition of claim 1, wherein the zero-shear viscosity of the polyetheramide at 220° C. is at least 500 Pas.

10. The composition of claim 9, wherein the zero-shear viscosity of the polyetheramide at 220° C. is at least 800 Pas.

11. The composition of claim 1, wherein the polyetherdiamine used to prepare the polyetheramide has a number-average molecular weight of from 230 to 4,000.

12. The composition of claim 1, wherein the fraction of the polyetheramide which derives from the polyetherdiamine is from 5 to 50% by weight.

13. The composition of claim 1, wherein the zero-shear viscosity at 220° C. is at least 2,000 Pas.

14. The composition of claim 13, wherein the zero-shear viscosity at 220° C. is at least 5,000 Pas.

15. The composition of claim 1, further comprising at most 50% by weight of one or more other polymers, based on the weight of the composition.

16. A molding produced by the composition of claim 15.

17. The molding of claim 16, which comprises a member selected from a single pipe, a multilayered pipe, or a hollow article.

18. The composition of claim 1, further comprising at most 10% by weight of one or more conventional additives, based on the weight of the composition.

19. A molding produced by the composition of claim 18.

20. The molding of claim 19, which comprises a member selected from a single-layer pipe, a multilayer pipe, or a hollow article.

21. A molding produced from the composition of claim 1.

22. The molding of claim 21, produced by extrusion, coextrusion, blow molding, 3D blow molding, coextrusion blow molding, coextrusion 3D blow molding, coextrusion suction blow molding, or injection molding.

23. The molding of claim 21, which comprises a member selected from a single-layer pipe, a multilayer pipe, or a hollow article.

24. The molding of claim 21, which comprises a member selected from a subatmospheric-pressure line, an air line, a compressed air line, a control line, a coolant line, a fuel line, a ventilation line, a windshield-wash-system line, a line for hydraulic coupling systems, a servo control line, a line for air-conditioning systems of motor vehicles, a cable sheath, a wire sheath, a line for a mechanical or chemical engineering sector, a line used in medical devices, an injection-molded part of an oil filter or an injection-molded part of a fuel filter.

25. A method of preparing an article comprising extrusion molding the composition of claim 1.

26. A method of preparing an article comprising blow molding the composition of claim 1.

* * * * *